United States Patent [19]

Gaser et al.

[11] Patent Number: 5,041,749
[45] Date of Patent: Aug. 20, 1991

[54] HIGH SPEED, HIGH POWER, SINGLE PHASE BRUSHLESS DC MOTOR

[75] Inventors: Mirko Gaser, Zelezniki, Yugoslavia; Richard Kavanaugh, Bristol, Conn.

[73] Assignee: Iskra Electromorji, Itoki, Yugoslavia

[21] Appl. No.: 511,251

[22] Filed: Apr. 19, 1990

[30] Foreign Application Priority Data

Oct. 30, 1989 [YU] Yugoslavia .................. 2097/89

[51] Int. Cl.⁵ ............................................. H02K 21/12
[52] U.S. Cl. ................................. 310/156; 310/68 B; 310/89; 310/177; 310/254; 310/DIG. 3; 324/207.20
[58] Field of Search .............. 310/46, 177, 68 B, 89, 310/156, 254, 179, 180, 181, 184, 185, 261, 262, 218, DIG. 3, 258; 324/207.20, 207.25

[56] References Cited

U.S. PATENT DOCUMENTS

| 2,429,180 | 10/1947 | Barlick | 310/218 |
| 3,624,441 | 11/1971 | Todd | 310/179 |
| 3,883,633 | 5/1975 | Kohler | 310/181 |
| 4,086,519 | 4/1978 | Persson | 310/68 B |
| 4,454,438 | 6/1984 | Yamashita | 310/156 |
| 4,698,537 | 10/1987 | Byrne | 310/258 |
| 4,698,538 | 10/1987 | Yoshida | 310/179 |
| 4,874,975 | 10/1989 | Hertrich | 310/179 |

OTHER PUBLICATIONS

IBM Techn. Disclosure Bulletin, vol. 16, No. 6, 11/1973, Magnet Field Bias, V. H. Boler.

Primary Examiner—R. Skudy
Attorney, Agent, or Firm—Curtis, Morris & Safford

[57] ABSTRACT

A DC brushless motor comprising a rotor shaft, and rotor assembly mounted on the rotor shaft. The rotor assembly includes a permanent magnet rotor and a plurality of sequentially stacked rotor laminations positioned between the rotor magnet and the rotor shaft. The permanent magnet rotor is magnetized with N number of rotor poles. A stator assembly in magnetic flux relationship with the rotor assembly is provided. The stator assembly includes plurality of sequentially stacked stator laminations with each stator lamination having N number of stator poles. The stator laminations are juxtaposed to the permanent magnet rotor such that each stator pole is of a different polarity from the corresponding rotor pole. The distance between the stator and rotor poles forms an air gap. Each of the stator poles are slightly skewed with respect to each of the corresponding rotor poles such that the air gap is asymmetrical. Electrical windings are provided for energizing the stator poles to operate the rotor.

33 Claims, 4 Drawing Sheets

HIGH SPEED, HIGH POWER, SINGLE PHASE BRUSHLESS DC MOTOR

BACKGROUND OF THE INVENTION

This invention relates to electric rotating machines, and more particularly, to a new and improved brushless DC motor.

In conventional brushless DC motors, a permanent magnet rotor assembly is provided. A stator, including coils and associated electrical circuitry, is fixedly arranged within the rotor to interact with the latter and impact a rotational torque thereto. Certain problems arise, however, in motors of this type. For example, normal brushless DC motors operate from a DC supply which controls the current in phases by chopping the voltage. To achieve very high speeds, it is necessary to quickly change the direction of the current in phases. The speed achieved, however, is limited by the inductivity of the winding and the supply voltage. As such, a motor having a very low inductivity is advantageous.

Additionally, in the past, one phase permanent magnet motors with skewed stators have been utilized. Furthermore, it is well known that a two phase motor of the same size has more power than a one phase motor, and likewise, a three phase motor has more power than a two phase motor. This result will occur if the motor operates at low speed, and rotates in both directions at high starting torques. It is desirable, however, in some applications where high starting torques are not necessary, that the motor operate at high speeds, high power but rotate in only one direction. A typical application requiring these criteria is a vacuum cleaner motor. As such, for these applications, it is desirable to provide a motor which generates high power at high speeds and rotates in only one direction but does not necessarily require a high starting torque.

Furthermore, in prior high speed motors, it is extremely difficult to securely retain the magnets in their proper position without "flying off" the core. Such a problem inherently reduces the efficiency of the motor.

The present invention is directed toward solving these problems and provides a workable and economical solution to them.

OBJECTS OF THE INVENTION

It is therefore a general object of the present invention to provide an improved brushless DC motor.

It is also an object of the present invention to provide a brushless DC motor having very low inductivity.

It is a further object of the present invention to provide a brushless DC motor having a high power/volume ratio.

It is yet a further object of the present invention to provide a multi-pole single phase brushless DC motor having a high rotor air gap flux density and low stator and rotor iron saturation levels.

It is a still further object of the present invention to provide a brushless DC motor which operates at high power, high speeds and rotates only in one direction.

It is still a further object of the present invention to provide a brushless DC motor which securely retains the magnets in their proper position without "flying off" the core.

It is yet another object of the present invention to provide a brushless DC motor which is economical and efficient in use.

The above, and other objects, advantages and features of this invention will become apparent from the following detailed description.

SUMMARY OF THE INVENTION

In an illustrative embodiment of the invention, there is provided a brushless DC motor having a rotor assembly mounted on a rotor shaft. The rotor assembly has a permanent magnet rotor and a plurality of sequentially stacked rotor laminations positioned between the rotor magnet and the rotor shaft. Each of the rotor laminations is made of laminated iron and has a central aperture therein for receiving and retaining the rotor shaft. The permanent magnet rotor field has a generally trapezoidal flux distribution.

A stator assembly is in magnetic flux relationship with the rotor assembly and includes a plurality of sequentially stacked stator laminations having an inner edge and an outer edge. Each of the stator laminations has four stator poles along their inner edge which are juxtaposed to the permanent magnet rotor such that each of the stator poles is of a different polarity than the corresponding rotor pole with the distance between the stator and rotor poles forming an air gap. Each of the stator poles has a first end and a second end with the distance between the first end and the permanent magnet rotor being greater than the distance between the second end and the permanent magnet rotor such that the air gap between each of the stator poles and each of the corresponding rotor poles is not constant enabling the rotor to rotate in a predetermined initial direction and to compensate for the saturation of the rotor and stator iron.

A Hall sensor is positioned remote from the stator and rotor assemblies which senses the position and direction of the rotor assembly in relation to the stator. A Hall sensor magnet is positioned adjacent to the Hall sensor. This sensor magnet is mounted on the rotor shaft such that the rotation of the shaft provides a signal to the Hall sensor.

At least four electrical windings of generally triangular cross-section are wound around the top and bottom surfaces of the stator laminations with at least two of the electrical windings of the same polarity being provided within one of a plurality of recesses formed within the inner edges of the stator laminations. The electrical windings permit the stator poles to operate the rotor and are wound in a single phase to obtain a polarity of each stator pole which is different than the polarity of its corresponding rotor pole. These electrical windings provide a power efficiency of the motor to over 90%.

A pair of end bells are positioned adjacent to the outer edge of each stator lamination. These end bells support the stator and rotor assemblies within the brushless DC motor housing.

As a result of the design of the present invention, not only is a h efficiency achieved, but the motor may operate at high speeds. Additionally, the present invention provides a motor having a high power/volume ratio as well as provides for high flux density and low inductivity.

The foregoing and other objects and advantages of the invention will become more fully apparent from the following detailed description and from the appended drawings in which like numbers have been used to describe like parts of the several views.

BRIEF DESCRIPTION OF THE DRAWINGS

The following detailed description given by way of example but not intended to limit the present invention solely to the specific embodiments described may best be understood in conjunction with the accompanying drawings in which.

DETAILED DESCRIPTION OF A PREFERRED EMBODIMENT

Figure 1:
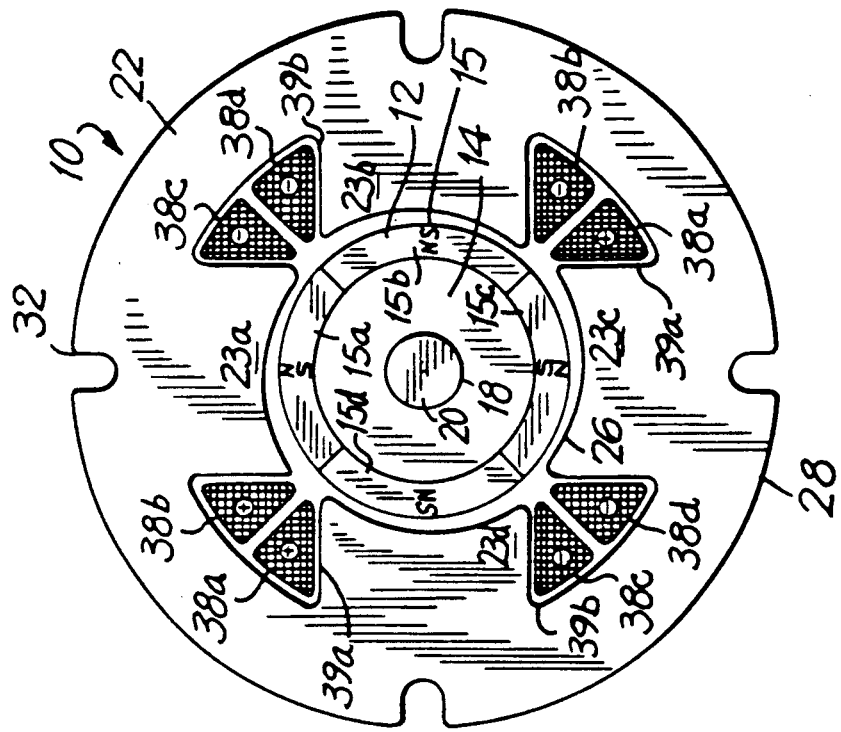
FIG. 1 is a front cross-sectional elevational view of a brushless DC motor in accordance with an illustrative embodiment of the present invention.
Figure 2:
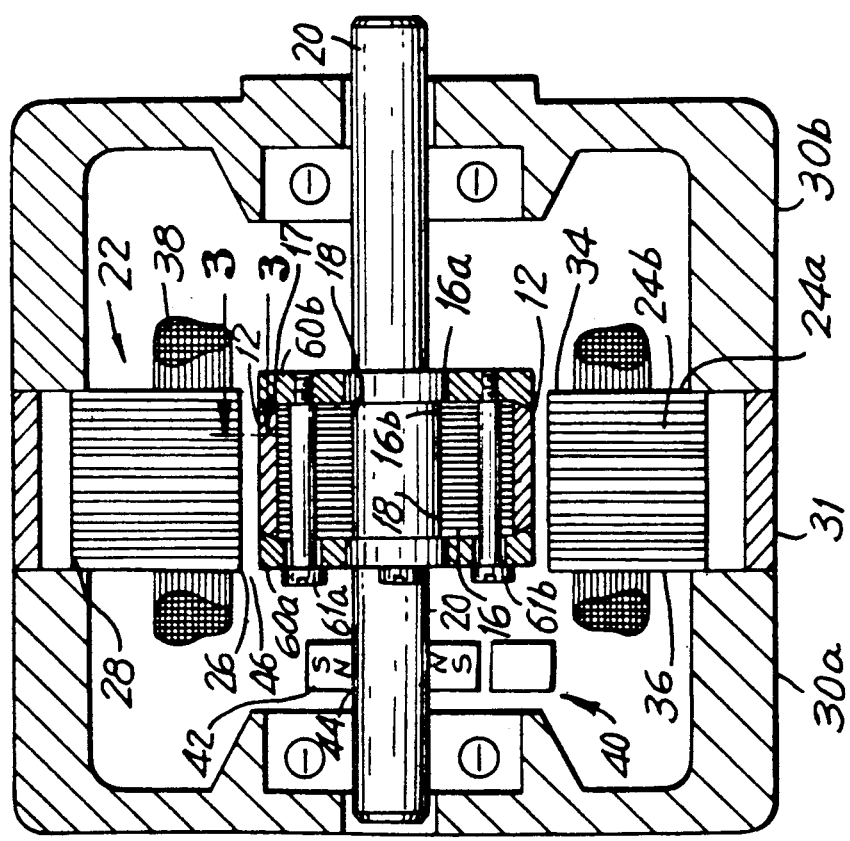
FIG. 2 is a top partly cross-sectional plan view of an illustrative embodiment of a stator assembly to be used in conjunction with the brushless DC motor of the present invention.
Figure 7:
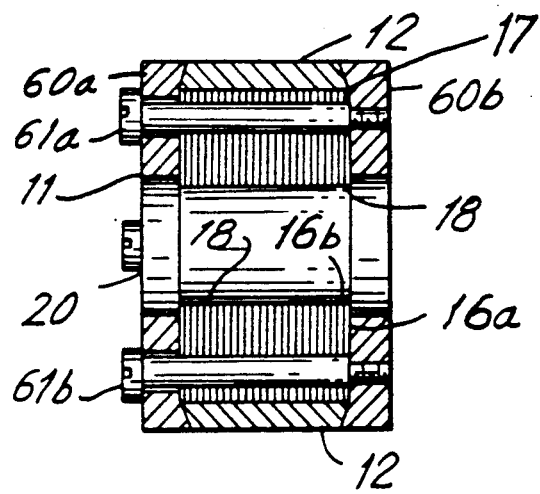
FIG. 7 is a cross-sectional view of a preferred embodiment of the rotor assembly of the present invention.

Referring now to FIGS. 1, 2 and 7, a brushless DC motor 10 includes a rotor assembly 11 and stator assembly 22. The rotor assembly of the DC motor 10 (see FIGS. 1 and 7) includes a permanent magnet 12 which is in the form of a ring or a ring composed of arc segments (see FIGS. 9 and 10). The permanent magnet rotor 12 includes an inner face 14 which defines the inner aperture of the rotor magnet and an outer face 15.

Figure 9:
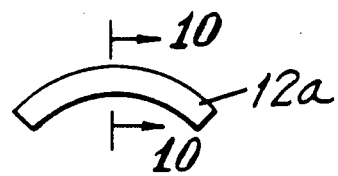
FIG. 9 is a top elevational view of one arc segment of a preferred embodiment of the rotor magnet of FIG. 1.
Figure 10:
FIG. 10 is a side cross-sectional view taken along line 10—10 of FIG. 9.

The rotor assembly 11 also includes a rotor back iron 16 formed of a plurality of sequentially stacked rotor laminations, such as 16a and 16b. Each of the rotor laminations includes an outer edge 17 and inner edge 18 which defines a central opening 18 of the rotor laminations. Each central opening 18 receives and retains a rotor shaft 20 therebetween. Thus, the sequentially stacked rotor laminations 16a and 16b are positioned between permanent magnet rotor 12 and rotor shaft 20. The permanent magnet rotor is magnetized with four rotor poles 15a, 15b, 15c and 15d, however, the DC motor 10 can be made as a four, six, eight, ten, twelve, etc., pole motor. The permanent magnet rotor is preferably formed in four sections with each section forming one of the rotor poles. As is shown in FIG. 9, these sections may take the form of circular arc segments, such as 12a, which are generally wedge-shaped in cross-section (see FIG. 10).

As is illustrated in FIGS. 1, and 2, brushless DC motor 10 also includes a stator assembly 22 in magnetic flux relationship with rotor assembly 11. The stator assembly includes a plurality of sequentially stacked stator laminations, such as 24a and 24b, each having an inner diameter edge 26 and outer diameter edge 28. Each of the stator laminations 24a and 24b has preferably four stator poles, such as 23a, b, c and d along its inner edge 26. Four stator poles are shown, but the motor 10 can be made as a four, six, eight, ten, twelve, etc., pole motor, the only limitation being that the number of rotor and stator poles are the same. The stator poles 23a, b, c and d are juxtaposed to the permanent magnet rotor 12 such that each of the stator poles is of a different polarity than its corresponding rotor pole 15a, b, c and d, respectively. Therefore, rotor pole 15a will be of an opposite polarity than stator pole 23a, rotor pole 15b will be of an opposite polarity than stator pole 23b, rotor pole 15c will be of an opposite polarity than stator pole 23c, and rotor pole 15d will be of an opposite polarity than stator pole 23d. This stator assembly can be contained within the housing 31 illustrated in FIG. 1.

Figure 3:
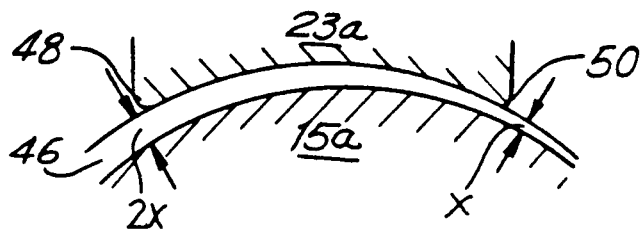
FIG. 3 is an enlarged top elevational view taken along line 3—3 of FIG. 1.

In accordance with one of the general objects of the present invention, an asymmetrical air gap is provided. The air gap 46 is defined as the distance between the stator and rotor poles. As is more specifically shown in FIG. 3, each of the stator poles, such as 23a, is slightly skewed with respect to each corresponding rotor pole, such as 15a, such that the air gap is asymmetrical enabling the rotor to rotate in a predetermined desired initial direction and to compensate for the saturation of the rotor and stator iron. Due to the asymmetrical air gap, more power is generated from the motor, desired torque/speed characteristics are achieved, and enhanced current forms are provided.

Figure 6:
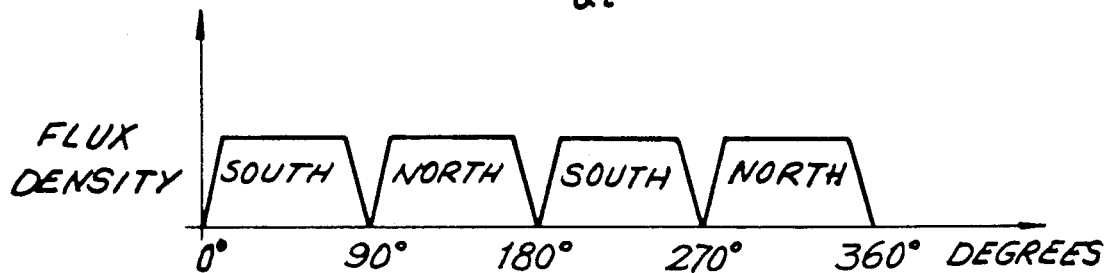
FIG. 6 is an electrical phase diagram of the flux density around the rotor of the brushless DC motor of FIG. 1.

In one preferred embodiment, the permanent magnet rotor has a trapezoidal flux distribution. In other words, since the rotor has an equal number of north and south poles, a trapezoidal flux distribution results if the flux density is measured around the rotor (see FIG. 6).

More specifically, each stator pole includes a first end, such as 48, and a second end, such as 50. The distance between first end 48 and the permanent magnet rotor 12 is greater than the distance between second end 50 and the permanent magnet rotor 12. Preferably, the air gap 46 between the first gap and rotor magnet 12 is approximately two-times the air gap between second end 50 and rotor magnet 12. As such, the air gap 46 between each rotor pole and its corresponding stator pole is not constant.

The electrical windings 38 of the motor 10 are wound around the top surface 34 and bottom surface 36 of the stator laminations. In the preferred embodiment, four electrical windings are provided of generally triangular cross-section with windings 38a and 38b being positively charged and windings 38c and 38d being negatively charged. These electrical windings are wound in a single phase to obtain a polarity of each stator pole 23a, b, c and d that is opposite to the polarity of its corresponding rotor pole, such as 15a, 15b, 15c and 15d, respectively. At least two of the electrical windings of the same polarity are provided within recesses 39a and b formed along the inner diameter edge 26 of the stack of stator laminations. In the preferred embodiment, the positively charged electrical windings 38a and b are provided within recess 39a and negatively charged windings 38c and d are provided within recess 39b.

In accordance with one of the general objects of the present invention, a high efficiency brushless DC motor is provided. More specifically, a power efficiency of the motor of over 90% is obtainable by the structure of the motor of the present invention. This efficiency is obtainable due to the use of high power magnets, low hysteresis and I²R losses and the motor does not limit the current by chopping (except at the start), which in turn, results in low eddy current losses and low hysteresis losses. Furthermore, since the motor is of single phase, the optimum point for changing the current on the windings may be readily selected where the maximum speed of dI/dt is obtained (See FIG. 5). As a result of this design, a multi-pole motor (4, 6, 8, etc.) is provided which operates at high speeds. The operating speeds are achieved by utilizing high power magnets with high Br ($\approx$ 1 Tesla). This produces a high flux density in the small air gap which in turn provides for high ratio of back EMF voltage/turn of the stator windings. In order to achieve these parameters, a small number of winding turns are required which permits low inductivity (L=kN²). Furthermore, since the motor operates in only one phase, the design provides an optimum point for changing the direction of the current in the windings (See FIG. 5).

In order to sense, and therefore modulate, the position and direction of the rotor, a Hall sensor 40 is provided remote from the stator and rotor assemblies. This Hall sensor senses the position of the rotor in relation to the stator and provides for movement of the rotor in the desired direction. A Hall sensor magnet 42 is positioned adjacent to Hall sensor 40. The Hall sensor magnet 42 is mounted by the aperture 44 on the rotor shaft 20. The energization of the Hall sensor is more specifically shown in FIG. 4b.

With this design, if the current flows through the winding in only one direction, the rotor will rotate until the south poles of the rotor mate exactly with the north poles of the stator (likewise, the north poles of the rotor mate exactly with the south poles of the stator) thereby causing the rotor to stop. The Hall sensor, however, supplies a signal to the motor electronics (not shown) to change the direction of the current in the windings which in turn rotates the rotor in the desired direction so that the opposite poles of the rotor and stator will not directly mate.

As best shown in FIGS. 1 and 2, a pair of end bells 30a and b are provided and are positioned adjacent to the outer edge 28 of the stator laminations. These end bells support the stator and rotor assemblies within the motor housing 31. A plurality of notches 32 are provided along the outer edge 28 of the stator laminations such that a fastening means may be positioned therethrough for securely retaining the end bells 30a and b and stator and rotor assemblies within the motor housing 31.

Figure 8:
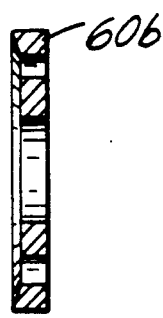
FIG. 8 is a side elevational view in cross-section of one of the end caps of the rotor assembly of FIG. 7.

In accordance with one of the general objects of this invention, the design of the circular wedge-shaped end caps 60a and 60b of the rotor (see FIGS. 7 and 8) and rotor magnets 12 provides for the secure retention of the rotor magnets in their proper position without "flying off" the core. The end caps 60a and b are secured to the rotor assembly by fastening means 61a and b.

FIGS. 4a-e illustrate the electrical phase diagrams of back EMF, the Hall sensor, the DC voltage on-phase, small load current, and high load current. Because of its design, the motor has a low inductivity and has almost square pulses of current at very high speeds. With a high flux density in the air gap between the stator and rotor assemblies, a reduced number of winding turns than is conventional is necessary. Since inductivity is proportional to N² (the number of winding turns), this design provides for low inductivity. As such, the motor may be used in applications requiring high power, high speed, low inductivity, but not necessarily high starting torque, for instance, in vacuum cleaner applications. From these FIGS. 4a-e, since the motor does not operate in a chopper mode, it is very efficient and has a high power/volume ratio, for the reasons previously described (i.e. high power magnets, high air gap flux density, low resistance, low hysterisis losses, low eddy current losses). Furthermore, a high power/volume ratio is achieved because the polarity of voltage on the windings is changed at the point of maximum back EMF voltage as illustrated in FIG. 5.

Figure 4A:
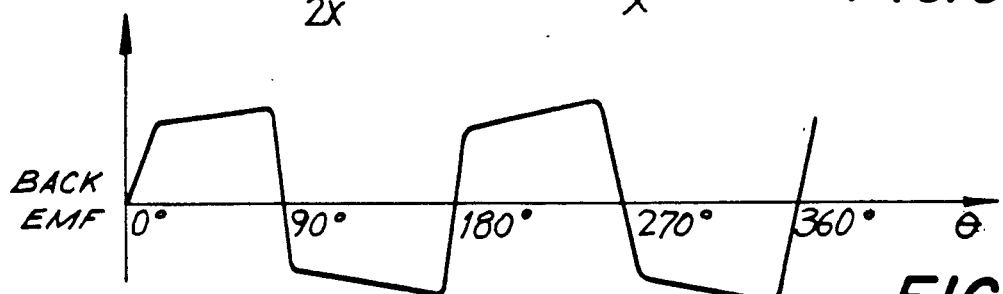
FIG. 4a is an electrical phase diagram of the back EMF voltage of the brushless DC motor of FIG. 1.
Figure 4F:
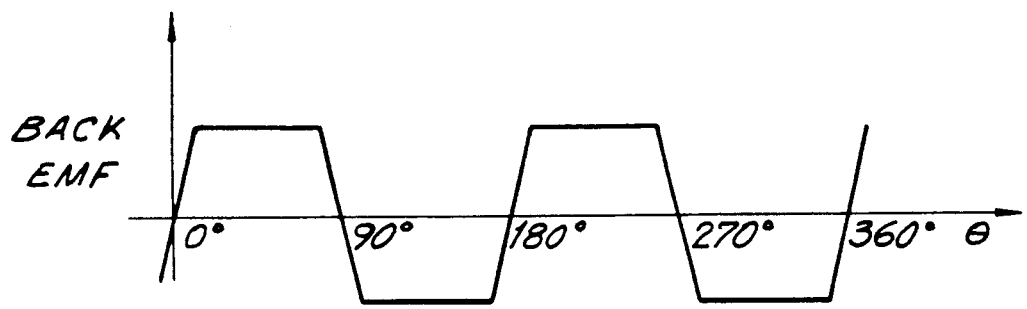
FIG. 4f is an electrical phase diagram of the back EMF voltage of a typical prior art brushless DC motor.
Figure 5:
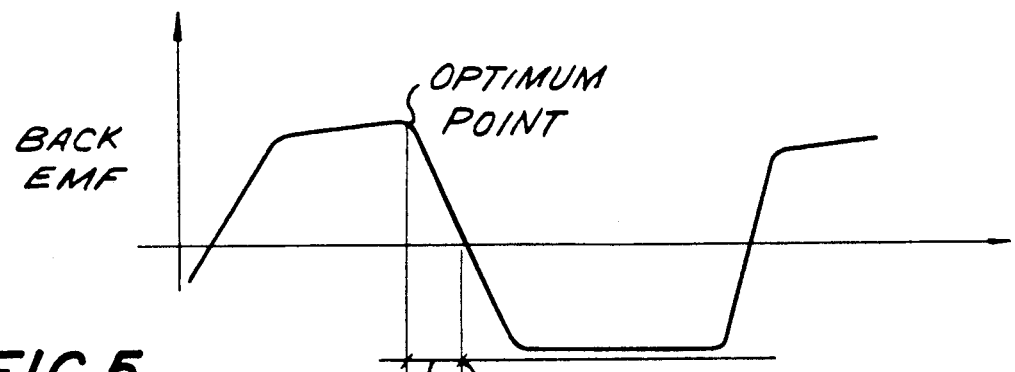
FIG. 5 is a graph chart plotting back EMF of the brushless DC motor of FIG. 1.

More specifically, FIG. 4a illustrates the back EMF applied to the windings if the motor is rotated at a constant speed (with another motor). This back EMF form is attributable to the skewed air gap. Without a skewed air gap, the back EMF on the windings would take the form shown in FIG. 4f. The back EMF form of FIG. 4a is advantageous to attain a high power/volume ratio. The magnetic characteristics of the rotor and stator iron are not linear and this form compensates for this nonlinearity at higher currents.

Figure 4B:
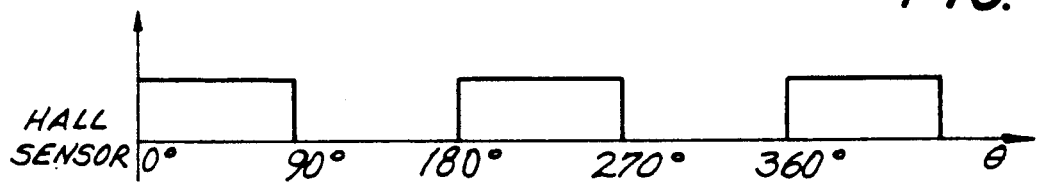
FIG. 4b is an electrical phase diagram of the Hall sensor incorporated in the brushless DC motor of FIG. 1.
Figure 4C:
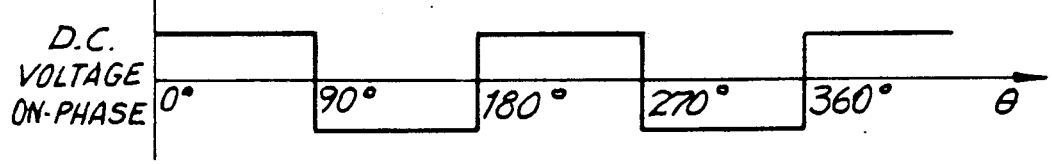
FIG. 4c is an electrical phase diagram of the DC voltage on-phase for the brushless DC motor of FIG. 1.
Figure 4D:
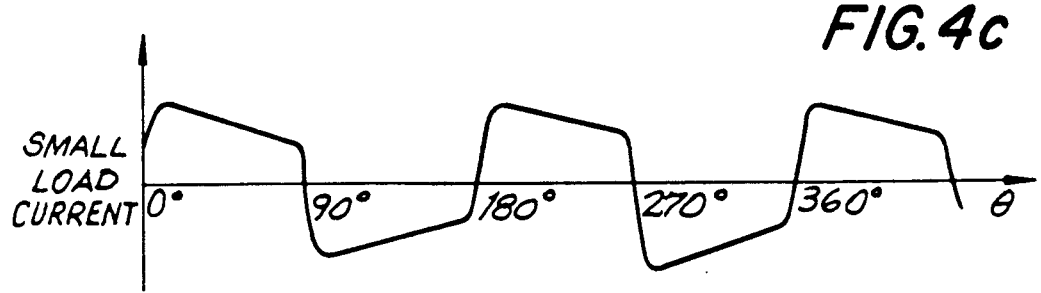
FIG. 4d is an electrical phase diagram of the small load current applied to the brushless DC motor of FIG. 1.
Figure 4E:
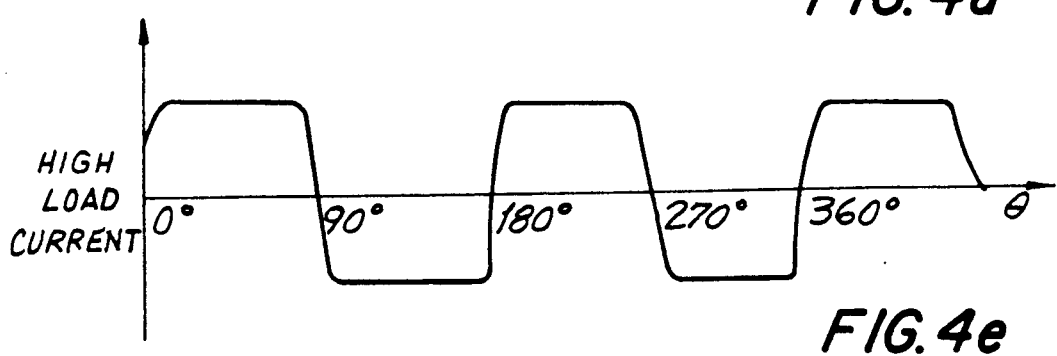
FIG. 4e is an electrical phase diagram of the high current applied to the brushless DC motor of FIG. 1.

FIG. 4b illustrates the output of the Hall sensor. As aforementioned, the Hall sensor indicates to the motor electronics, based on the position of the rotor in relation to the stator, the direction the current must flow, or at which point the direction of the current in the winding has to be changed. FIG. 4c illustrates the voltage applied to the winding of this DC brushless motor. Due to the fact that the stator iron is not saturated, low hysteresis and eddy current losses result.

In comparing the surface of the permanent magnet rotor to the surface of the stator in this motor, the stator/rotor pole ratio is approximately 1:1 such that sufficient space is available in the iron for the magnetic flux. Additionally, the rotor iron is not saturated eve when the motor has high flux density (B=0.8-1T) in the air gap. In a conventional rotor/stator design, the rotor/stator ratio is typically 1:2 or even 1:3. With the same flux density in the air gap for these conventional motors, there is two to three times less iron for the same amount of magnetic flux resulting in oversaturation.

While the invention has been particularly shown and described with reference to a preferred embodiment, it will be readily appreciated by those of ordinary skill in the art that various changes and modifications may be made therein without departing from the spirit and scope of the invention. For instance, the motor can be made as a four-pole, six-pole, eight-pole, ten-pole, twelve-pole, etc. motor. The number of poles for each given application will be dependant upon the torque constant, maximum RPM and space limitations of the motor. Additionally, with this design, this motor is very adaptable to a variety of applications. For instance, the motor can be made with a large diameter, high pole number with high torque constant, and hence, low RPM or the motor can be made as a four-pole motor with a small diameter stator with low torque constant to achieve a very high RPM. Furthermore, by changing the position of the Hall sensor, the operator can adjust the maximum RPM or torque/RPM characteristics of the motor. It is intended that the appended claims be interpreted as including the foregoing as well as various other such changes and modifications.

What is claimed is:

1. A brushless DC motor comprising:
   a rotor shaft;
   a rotor assembly mounted on said rotor shaft, said rotor assembly having a permanent magnet rotor and a plurality of sequentially stacked rotor laminations positioned between said rotor magnet and said rotor shaft, said permanent magnet rotor being magnetized with N number of rotor poles;
   a stator assembly in magnetic flux relationship with said rotor assembly and including a plurality of sequentially stacked stator laminations, each said stator lamination having N number of stator poles wherein each said stator pole corresponds to a rotor pole and is separated from the rotor pole by a corresponding distance, each said stator pole being juxtaposed to said permanent magnet rotor such that each said stator pole is of a different polarity than said corresponding rotor pole with the corresponding distance between said corresponding stator and rotor poles forming an air gap, each said stator pole being slightly skewed with respect to each said corresponding rotor pole such that said air gap is asymmetrical; and
   means for energizing said stator poles to operate said rotor.

2. The brushless DC motor as set forth in claim 1 wherein said rotor laminations are made from laminated iron.

3. The brushless DC motor as set forth in claim 1 wherein said rotor assembly has at least four rotor poles.

4. The brushless DC motor as set forth in claim 1 wherein said stator assembly has at least four stator poles.

5. The brushless DC motor as set forth in claim 1 wherein said permanent magnet rotor is in the form of a ring.

6. The brushless DC motor as set forth in claim 5 wherein said permanent magnet rotor is generally wedge-shaped.

7. The brushless DC motor as set forth in claim 1 wherein said permanent magnet rotor includes a plurality of arc segments.

8. The brushless DC motor as set forth in claim 7 wherein each said arc segment is generally wedge-shaped.

9. The brushless DC motor as set forth in claim 1 wherein said permanent magnet rotor has a trapezoidal flux distribution.

10. The brushless DC motor as set forth in claim 1 wherein said means for energizing said stator poles is wound in a single phase to obtain a polarity of each said stator pole different than the polarity of said corresponding rotor pole.

11. The brushless DC motor as set forth in claim 1 and further including a Hall sensor being positioned remote from said stator and rotor assemblies for sensing the position and direction of said rotor.

12. The brushless DC motor as set forth in claim 11 and further including a Hall sensor magnet positioned adjacent to said Hall sensor, said Hall sensor magnet being mounted on said rotor shaft such that the rotation of said shaft provides a signal to said Hall sensor.

13. The brushless DC motor as set forth in claim 1 wherein the power efficiency of the motor is above 90 percent.

14. The brushless DC motor as set forth in claim 1 wherein said energizing means includes at least four electrical windings of generally triangular cross-section.

15. The brushless DC motor as set forth in claim 14 wherein each said stator lamination includes a plurality of recesses with each said recess receiving at least two of said electrical windings of the same polarity.

16. The brushless DC motor as set forth in claim 1 and further including a pair of end bells supporting the stator and rotor assemblies therebetween.

17. A brushless DC motor comprising:
   a rotor shaft;
   a rotor assembly mounted on said rotor shaft, said rotor assembly having a permanent magnet rotor and a plurality of sequentially stacked rotor laminations positioned between said rotor magnet and said rotor shaft, said permanent magnet rotor being magnetized with N number of rotor poles;
   a stator assembly in magnetic flux relationship with said rotor assembly and including a plurality of sequentially stacked stator laminations, each said stator lamination having N number of stator poles wherein each said stator pole corresponds to a rotor pole and is separated from the rotor pole by a corresponding distance, each said stator pole being juxtaposed to said permanent magnet rotor such that each said stator pole is of a different polarity than said corresponding rotor pole with the corresponding distance between said corresponding stator and rotor poles forming an air gap, each said stator pole having a first end and a second end, the distance between said first end and said permanent magnet rotor is greater than the distance between said second end and said permanent magnet rotor such that said air gap between each said stator pole and each said corresponding rotor pole is not constant to enable said rotor to rotate in a predetermined initial direction;
   a Hall sensor being positioned remote from said stator and rotor assemblies for sensing the position and controlling the direction of said rotor assembly;
   a Hall sensor magnet positioned adjacent to said Hall sensor, said Hall sensor magnet being mounted on said rotor shaft such that the rotation of said shaft can be monitored by said Hall sensor; and
   means for energizing said stator poles to operate said rotor.

18. The brushless DC motor as set forth in claim 17 wherein said rotor laminations are made from laminated iron.

19. The brushless DC motor as set forth in claim 17 wherein said rotor assembly has at least four rotor poles.

20. The brushless DC motor as set forth in claim 17 wherein said stator assembly has at least four stator poles.

21. The brushless DC motor as set forth in claim 17 wherein said stator energizing means is wound in a single phase to obtain a polarity of each said stator pole different than the polarity of said corresponding rotor pole.

22. The brushless DC motor as set forth in claim 17 wherein the power efficiency of the motor is above 90 percent.

23. The brushless DC motor as set forth in claim 17 wherein said energizing means includes at least 2N electrical windings of generally triangular cross-section.

24. The brushless DC motor as set forth in claim 17 wherein each said stator lamination includes a plurality of recesses with each said recess receiving at least two said electrical windings of the same polarity.

25. A brushless DC motor comprising:
a motor housing;
a rotor shaft supported within the housing;
a rotor assembly mounted on said rotor shaft, said rotor assembly having a permanent magnet rotor and a plurality of sequentially stacked rotor laminations positioned between said rotor magnet and said rotor shaft, each said rotor lamination being made of laminated iron and having a central aperture therein for receiving and retaining said rotor shaft, said permanent magnet rotor having a trapezoidal flux distribution, said permanent magnet rotor being magnetized with at least four rotor poles, said magnet and said rotor laminations being supported within said rotor assembly by a pair of end caps;
a stator assembly in magnetic flux relationship with said rotor assembly and including a plurality of sequentially stacked stator laminations having an inner edge and an outer edge, each said stator lamination having at least four stator poles along said inner edge wherein each of said at least four stator poles corresponds to one of said at least four rotor poles and is separated from the rotor pole by a corresponding distance, each said stator pole being juxtaposed to said permanent magnet rotor such that each said stator pole is of a different polarity than said corresponding rotor pole with the distance between said stator and rotor poles forming an air gap, each said stator pole having a first end and a second end, the distance between said first end and said permanent magnet rotor is greater than the distance between said second end and said permanent magnet rotor such that said air gap between each said stator pole and each said corresponding rotor pole is not constant to enable said rotor to rotate in a predetermined initial direction;
a Hall sensor being positioned remote from said stator and rotor assemblies for sensing the position and controlling the direction of said rotor assembly;
a Hall sensor magnet positioned adjacent to said Hall sensor, said Hall sensor magnet being mounted on said rotor shaft such that the rotation of said shaft can be monitored by said Hall sensor;
means for energizing said stator poles to operate said rotor which are wound in a single phase to obtain a polarity of each said stator pole different than the polarity of each said corresponding rotor pole, said energizing means providing a power efficiency of the motor of over 90 percent; and
a pair of end bells positioned adjacent to said outer edge of said stator laminations for supporting the stator and rotor assemblies within said housing.

26. The brushless DC motor as set forth in claim 25 wherein said energizing means includes at least four electrical windings of generally triangular cross-section.

27. The brushless DC motor as set forth in claim 26 wherein each said stator lamination includes a plurality of recesses with each said recess receiving at least two said electrical windings of the same polarity.

28. The brushless DC motor as set forth in claim 25 wherein said permanent magnet rotor is in the form of a ring.

29. The brushless DC motor as set forth in claim 28 wherein said permanent magnet rotor is generally wedge-shaped.

30. The brushless DC motor as set forth in claim 25 wherein said permanent magnet rotor includes a plurality of arc segments.

31. The brushless DC motor as set forth in claim 30 wherein each said arc segment is generally wedge-shaped.

32. The brushless DC motor as set forth in claim 25 wherein each said rotor end cap is generally wedge-shaped.

33. A brushless DC motor comprising:
a rotor shaft;
a rotor assembly mounted on said rotor shaft, said rotor assembly having a permanent magnet rotor formed of a plurality of generally wedge-shaped arc segments and having a plurality of sequentially stacked rotor laminations positioned between said rotor magnet and said rotor shaft, said permanent magnet rotor being magnetized with N number of rotor poles;
a stator assembly in magnetic flux relationship with said rotor assembly and including a plurality of sequentially stacked stator laminations, each said stator lamination having N number of stator poles wherein each stator pole corresponds to a rotor pole and is separated from the rotor pole by a corresponding distance, each said stator pole being juxtaposed to said permanent magnet rotor such that each said stator pole is of different polarity than said corresponding rotor pole with the corresponding distance between said corresponding stator and rotor poles forming an air gap, each said stator pole being slightly skewed with respect to each said corresponding rotor pole such that said air gap is asymmetrical;
means for energizing said stator poles to operate said rotor; and
a pair of end bells supporting the stator and rotor assemblies therebetween.

* * * * *